United States Patent [19]

Chan

[11] Patent Number: 5,361,809
[45] Date of Patent: Nov. 8, 1994

[54] BINDING APPARATUS

[76] Inventor: Ts'ang-Chi Chan, Suite 1, 11F, 95-8 Chang Ping Road, Sec 1, Taichung, Taiwan, Prov. of China

[21] Appl. No.: 54,414

[22] Filed: Apr. 29, 1993

[51] Int. Cl.[5] .............................. B21F 15/04
[52] U.S. Cl. ............................ 140/119; 140/57
[58] Field of Search ............... 140/54, 57, 93 A, 93.6, 140/119, 120, 121, 122, 118

[56] References Cited

U.S. PATENT DOCUMENTS

| | | | |
|---|---|---|---|
| 951,454 | 3/1910 | Reichhelm | 140/119 |
| 1,671,456 | 5/1928 | Thompson | 140/119 |
| 2,655,953 | 10/1953 | Miloche | 140/121 |
| 5,217,049 | 6/1993 | Forsyth | 140/93.6 |

*Primary Examiner*—Lowell A. Larson

[57] ABSTRACT

A binding apparatus comprises generally an elastic handle, a rotatable element and a circular housing thereof, upon the arrangement of a gear on the lower portion of the rotatable element engaged with a beveled rack on the transverse lower portion of the handle, the rotatable element can be actuated to rotate continuously on a first disk on the top of the handle so as to provide adequate torque force to twist and beack up an iron wire in a single step for a scafford or a trellis construction. The circular housing which is attached to the lower portion of the handle is provided to store iron wires on working site. The characteristic of this disclosure is to provide an ease mechanical method to twist and break up iron wires instead of the manual method in conventional practice in order to reduce the labor as well as the time consumption.

2 Claims, 2 Drawing Sheets

BINDING APPARATUS

BACKGROUND OF THE INVENTION

The present invention relates to a binding apparatus, and more particularly to a structurally improved binding apparatus adapted for the construction of a grape trellis, a pergola, a flower arbor or a scafford that can simultaneously and readily process twisting and breaking of iron wire in one single step.

Currently, people binding a scafford and a trellis both in construction or in agriculture field are still performed by manual method such that they cutted up the iron wire in pieces in predetermined length at first. Then bind and twist those cutted iron wires one by one by a pincers on each of the junctions of the poles used to build up a scafford or trellis. Recently, people use twist tie or wire reinforce binding tape instead of the cutted round iron wire in order to simplify the binding process. But it still requires a large scale of manual performance in twisting.

SUMMARY OF THE PRESENT INVENTION

The principle object of the present invention is to provide a binding apparatus which can automatically and simultaneously twist and break up an iron wire, specific in twist tie or wire reinforce binding tape in a single step in order to reduce the consumption of manpower as well as the time for constructing the scafford or trellis.

Accordingly, the present invention of a binding apparatus comprises generally a handle, a rotatable element and a circular wire housing.

The handle is composed of a pair of slightly incurvated calipers and a resilient spring. The first caliper has an inwardly transverse bottom portion which on upper surface has a rack of beveled cogs and an axle aperture formed on upper portion proximite the elliptical free end. The second caliper which is slightly longer than the first caliper has also an inwardly transverse bottom beneath to its opposite equivalent of the first caliper. The bottom portion has a pair of spaced screw holes vertically formed on bottom surface. The second caliper further has an axle aperture formed on upper portion provided in registry with the similar aperture on the supper end of the first caliper for pivotedly joined by an axle screw and a vertical cylindrical rod extended upwardly from the upper end of the second caliper. A first disk which is perpendicularly connected to the top end of the rod, a circular aperture formed at center and a pair of rectangular slots formed on opposite circumference along a diametric line of the disk. The resilient spring which has a pair of incurvated long legs being bent laterally on their ends is connected respectively with the inner peripheries of the pair of the calipers. The rotatable element comprises a second disk, a blade member and an axle rod. The second disk which is made shapely and dimensionally equalized with the first disk has also a pair of rectangular slots made in registry with the slots on the first disk and a pair of spaced screw holes along a diameter perpendicular to the center line of the pair of rectangular slots, for adjustably disposed thereon the blade member which comprises a pair of parallel blades fixedly secured on their central portion thereon a transverse rectangular plate on which is a pair of elongate apertures formed in proximite two end. A pair of screws are used to adjustably dispose the blade member by inserting the screws through those elongate apertures screwed in the pair of screw holes on the top of the second disk. The pair of the parallel blades have their ends bent outwardly and defined in between a gap superposed to the circumferential slots on the disk accessibly to twist tie. The axle rod which is perpendicularly connected on upper end thereon the center of under side of the disk has a lower threaded end. The rotatable element is assembled with the handle by inserting the axle rod through the central aperture of the first disk until the under side of the second disk abutting on the upper surface of the first disk on their circumferential slots aligned with each other. The a gear perpendicularly and fixedly telescopes on center aperture on the lower threaded end of the axle rod secured with a nut. The gear is positioned as its teeth can engage with the cogs of the rack on the upper surface of the transverse lower portion of the first caliper. So that the rotatable element can be generated to rotate on the circular aperture of the first disk by the gear which is drived by the parallel movement of the rack. The circular housing has a generally circular end wall to define a generally cylindrical hollow interior for receiving a roll of twist tie and a recess formed on the end wall for picking up the twist tie out of the housing when it is put in for use. A L shaped support tangentially secured on the end of its vertical portion thereon the outer periphery of the end wall of the housing. The transverse portion of the L shaped support is parallelly secured to the under side of the transverse portion of the second caliper by a pair of screws.

Upon aforediscussed arrangement, a worker can grasp the handle with one hand and pick up the free end of a roll of twist tie out of the housing with another hand, then lead the wire to be passed in place of one of the rectangular slots on the disk and go upwardly to overpass a working club object before returning back to place it therein the another rectangular slot on the opposite circumference of the disk. Now, press the pair of calipers inwardly to actuate the rotatable element begins to rotate on the first disk by the parallel movement of the rack which is pressed inwardly by hand and resiled back outwardly by the resilient spring. Each turn of to and fro of the rack can make the rotatable element to turn about 360° on the first disk. Continuous pressure applied on the elastic handle can make the rotatable element to turn continuously to provide endless torque force to twist the wire on the object until it is broken up by the blade member on the second disk under a predetermined degree of tension.

The objects and advantages of the present invention will become apparent in a consideration of enusing the description and drawings.

DETAILED DESCRIPTION OF THE PREFERRED EMBODIMENT OF THE PRESENT INVENTION

Figure 1:
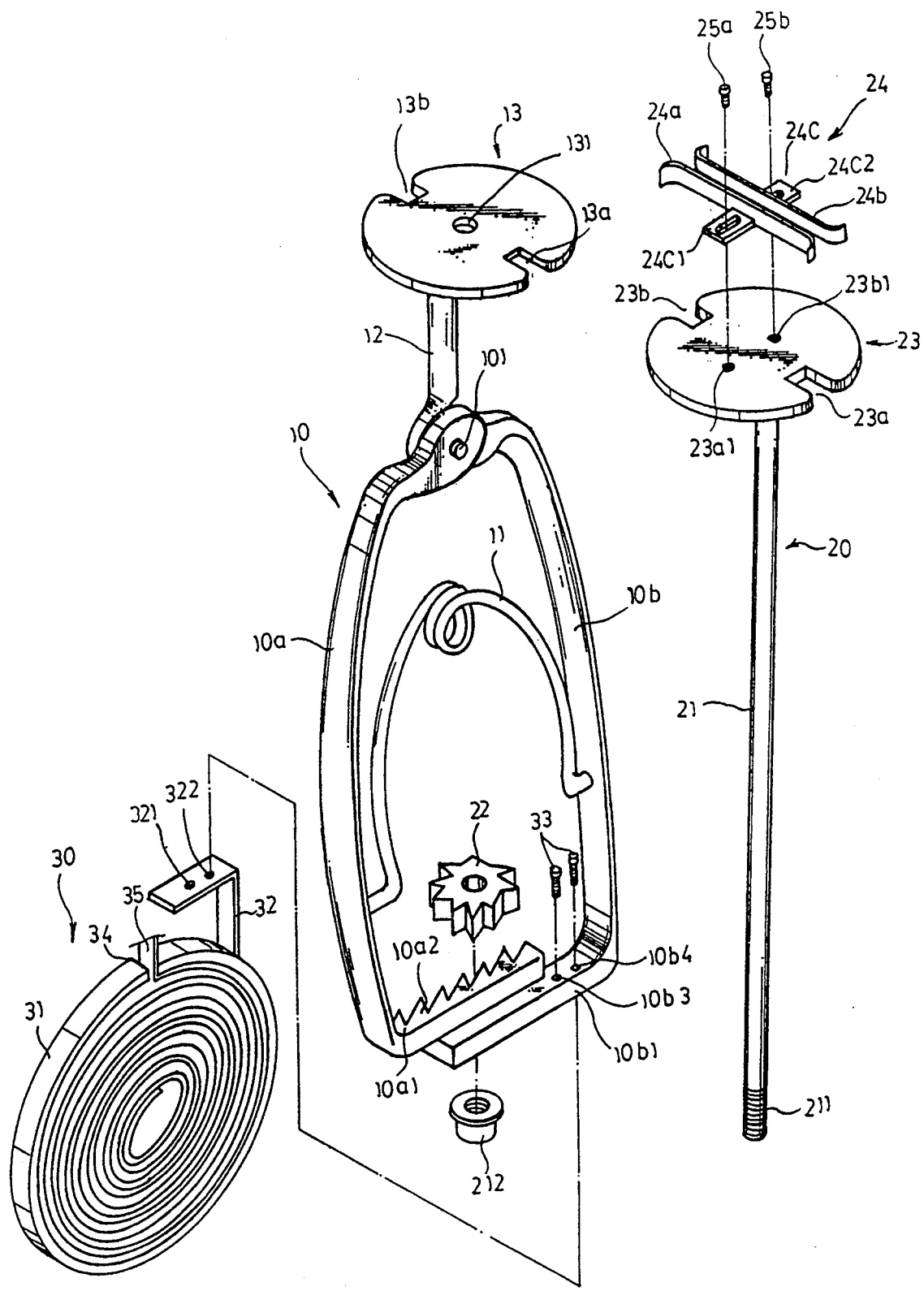
FIG. 1 is a schematic perspective view of show the components of the preferred embodiment according to the present invention.

Referring to FIG. 1 of the drawings, the present invention of a binding apparatus comprises generally a handle 10, a rotatable element 20 and a circular housing thereof 30. The elastic handle 10 is composed of a pair of slightly incurvated calipers 10a and 10B and a resilient spring 11. The first caliper 10a has an inwardly transverse bottom portion which on upper surface has a rack 10a1 of beveled cogs 10a2 and an axle aperture 101 formed on upper portion proximite to its elliptical end. The second caliper 10b which is slightly longer than the first caliper 10a has also an inwardly transverse bottom portion 10b1 positioned beneath to it's opposite equivalent of the first caliper 10a. The bottom portion has a pair of spaced vertical screw holes 10b3 and 10b4 on bottom surface. The second caliper further has an axle aperture formed on upper portion provided in registry with the similar aperture 101 on the upper end of the first caliper 10a for pivotedly joined by an axle screw and a vertical cylindrical rod extended upwardly from the upper end of the second caliper. A first disk 13 which is perpendicularly connected to the top end of the rod has a circular aperture 131 formed at center and a pair of rectangular slots 13a and 13b formed on opposite circumference along a diametric line of the disk 13. The resilient spring 11 has a pair of incurvated long legs bent laterally on their ends for connecting on the inner peripheries of the calipers 10a and 10b respectively.

The rotatable element 20 comprises an axle rod 21, a second disk 23 and a blade member 24. The disk 23 which is shapely and dimensionally equalized to the first disk 13 has also a pair of rectangular slots 23a and 23b made shapely and positionally in registry with the slots 13a and 13b on the first disk 13 and a pair of spaced vertical screw holes 23a1 and 23b1 formed positionally along a diametrical line perpendicular to the central line of the slots 23a and 23b. the blade member 24 comprises a pair of parallelly disposed rectangular blades 24a and 24b fixedly secured on their central portion on a transverse rectangular plate 24c which has a pair of vertical elongate apertures 24c1 and 24c2 formed in proximite to each end for adjustably secured the blade member 24 by a pair of screws 25a and 25b in the spaced screw holes 23a1 and 23b1 on the upper surface of the second disk 23 with an elongate gap which is defined by the pair of parallelly disposed blades 24a and 24b in aligned with the pair of the slots 23a and 23b. The pair of the rectangular blades 24a and 24b have been bent outwardly on their ends to define smooth entrances accessible to twist tie 35. The axle rod 21 which has a lower threaded end 211 is perpendicularly connected on upper end with the center on the under side of the second disk 23.

The rotatable element 20 is assembled with the handle 10 by inserting the axle rod 21 inserted through the central aperture 131 of the first disk 13 until the under side of the second disk 23 abutting on the upper surface of the first disk 13 with their circumferential slots 13a 13b and 23a 23b in alignment with each other. Then a gear 22 is perpendicularly and fixedly telescoped on center aperture on the lower threaded end 211 of the axle rod 21 and secured with a nut 212. The gear 22 is in a elevational position in registry with the rack 10a1 on the transverse lower portion of the first caliper 10a in such manner that the gear 22 can engage with the beveled rack in completely cog-joint.

When pressure applied to the elastic handle 10, the rack 10a1 will move parallelly to and fro within the handle 10 to drive, through the gear 22 the rotatable element 20 to turn continuously on the first disk 13. Each to and fro movement of the rack 10a1 can acutate the rotatable element 20 to turn about 360°.

The circular housing 30 which receives a roll of twist tie 35 for the apparatus has a circular end wall 31 to define a generally cylindrical hollow interior, a recess 34 formed on the upper portion of the wall 31 and a L shaped support 32 which is tangently and fixedly secured on vertical portion onto the outer periphery of the wall 31 and has a pair of spaced vertical screw holes 321 and 322 on the transverse portion provided in registry with those screw holes 10b3 and 10b4 on the transverse lower portion of the second caliper 10b. So that the circular housing 30 is fixedly attached onto the handle by a pair of screws 33.

Figure 2:
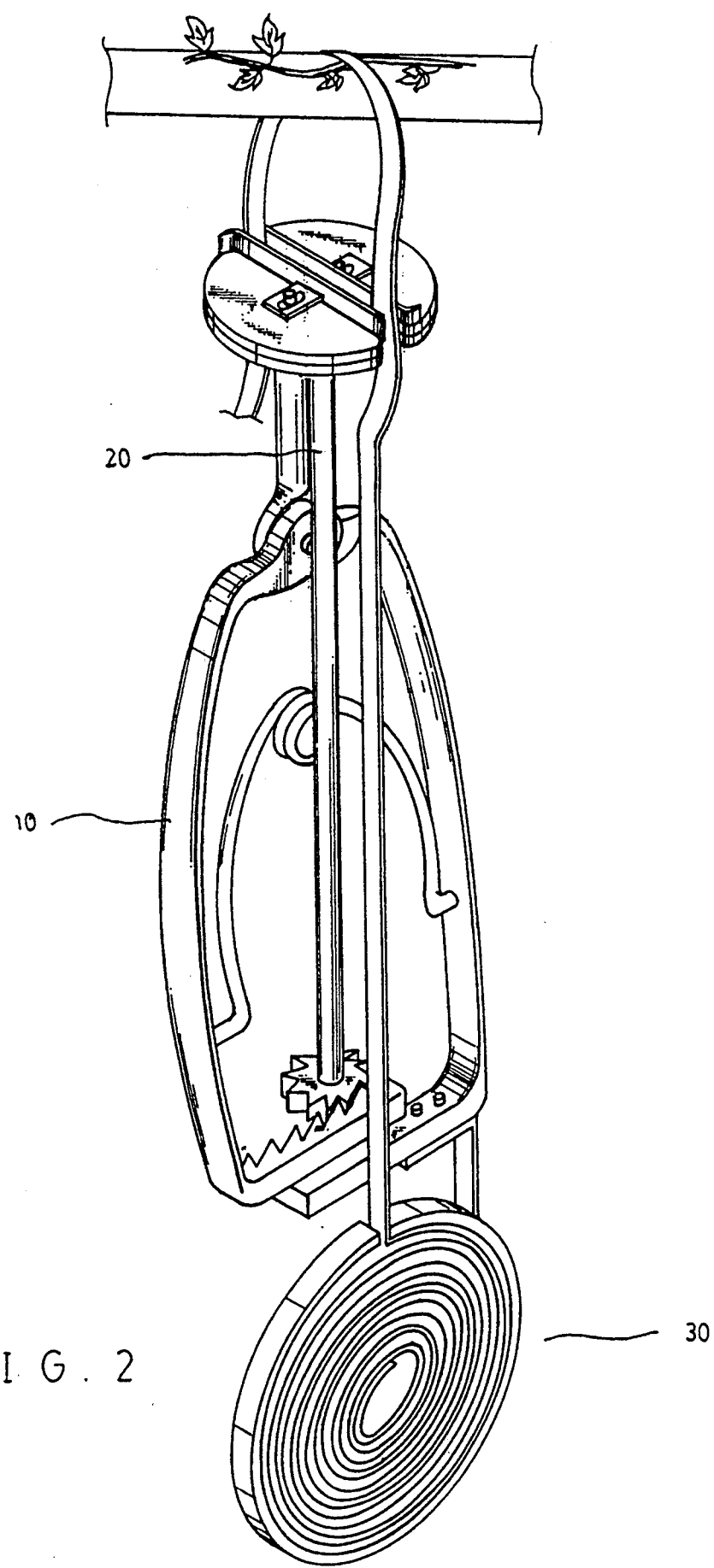
FIG. 2 is a perspective view to show a preferred embodiment of the present invention.

Referring to FIG. 2, upon aforediscussed arrangement, a worker can grasp the handle with one hand and pick up the free end of the roll of twist tie or wire 35 through the recess 34 of the circular housing 30 with another hand. Then lead the twist tie 35 to be passed in place of the rectangular slot 13a on one side of the disk and go upwardly to have the wire 35 to overpass a working club object before returning back to lead it in place another rectangular slot 13b on the opposite circumference of the disk. Now, begin to press the elastic handle 10 sequentially to have the rack 10a1 moved to and fro within the handle 10 to drive the rotatable element 20 to turn continuously. Thus, the wire 35 will be twisted under a torque force of the element 20 and broken up by the blade member 24 on the second disk 23 under a predetermined degree of tension.

Based on aforediscussed structure, this disclosure of a binding apparatus provides an automatic and simultaneous accomplishment of twisting and breaking up the wires or twist tie in one single step on the scafford or treelis construction in order to reduce the manpower as well as the time consumption.

The scope of this invention should determined by the appended claims and their legal equivalents rather than by the example given.

I claim:

1. A binding apparatus, comprising:
a handle which comprises a first caliper, a second caliper and a resilient spring; said first caliper having an inwardly extended transverse bottom portion which forms a rack with beveled cogs on its upper surface and a first axle aperture proximate the upper portion thereof; said second caliper having an inwardly extended transverse bottom portion which is spacedly beneath said transverse bottom portion of said first caliper and has a second axle aperture on the upper portion thereof; a vertical rod being extended upwardly from the upper end of said second caliper; a first disk being perpendicularly connected to the top end of said rod and having a central aperture; said first and second calipers being pivotedly connected by an axle screw with said first and second axle apertures and elastically connected by said resilient spring on their mid portion;
a rotatable element which comprises a second disk, a blade member adjustably secured on the upper surface of said second disk, and an axle rod having a lower threaded end; the top end of said axle rod being connected to the center of the under side of said second disk; a gear being fixedly screwed to said lower threaded end of said axle rod by a nut; said rotatable element being assembled to said handle by inserting said axle rod through said central aperture of said first disk until the under side of said second disk abuts on the upper surface of said first disk, and keeping said gear engaged with said beveled rack therein; said first and second disks being similar in shape and dimension and each having a pair of slots on their opposite circumferences in radial direction; said blade member comprising a pair of parallelly disposed rectangular blades firmly secured on their central portions on a transverse rectangular plate which has a pair of vertical elongate apertures formed proximate to each end for adjustably secured said blade member by a pair of screws respectively to the upper surface of said disk to define an elongate gap between said pair of parallelly disposed blades which is aligned with said pair of slots; and a circular housing which has a circular end wall to define a cylindrical hollow interior to receive a roll of twist tie, a recess formed on the upper portion of said wall and a L-shaped support tangently secured on a vertical portion thereof to the outer periphery of said wall; said circular housing being assembled to said handle by securing said L-shaped support onto the under side of said transverse bottom portion of said second caliper.

2. A binding apparatus as recited in claim 1, wherein each end of said pair of rectangular blades has been bent outwardly to define two opposite smooth entrances respectively.

* * * * *